United States Patent [19]

Battista

[11] 3,732,491

[45] May 8, 1973

[54] LASER ENERGY MONITOR CIRCUIT

[75] Inventor: Albert D. Battista, Sturbridge, Mass.

[73] Assignee: American Optical Corporation, Southbridge, Mass.

[22] Filed: Jan. 21, 1971

[21] Appl. No.: 108,367

[52] U.S. Cl. ....................324/102, 324/96, 356/215

[51] Int. Cl. ........................G01r 19/16, G01r 31/00

[58] Field of Search ......................324/103 P, 103 R, 324/102, 96, 123 R; 356/215, 225; 329/106, 109

[56] References Cited

UNITED STATES PATENTS

| | | | |
|---|---|---|---|
| 3,049,050 | 8/1962 | Thomas | 356/215 |
| 3,495,916 | 2/1970 | Morgan | 356/215 |
| 3,548,307 | 12/1970 | Fathauer | 324/103 R |
| 3,486,821 | 10/1969 | Westhaver | 356/215 X |

OTHER PUBLICATIONS

Philbert, M., "Photometrie Du Laser...", La Recherche Aerospatiale, No. 110, January–February 1966, pp. 49–58.

*Primary Examiner*—Rudolph V. Rolinec
*Assistant Examiner*—Ernest F. Karlsen
*Attorney*—William C. Nealon, Noble S. Williams, Robert J. Bird and Joe Wall

[57] ABSTRACT

A laser energy monitor circuit. A fixed fraction of the energy output of a laser is diffused and then directed to a photodiode, and the diode output current is integrated. The integrated signal is transferred to a peak detector which, in turn, drives an FET transistor. The output of the transistor, which may persist for many minutes even in the case of a nanosecond laser pulse, drives a meter and thus provides an extended visual indication of the energy in the pulse.

1 Claim, 1 Drawing Figure

PATENTED MAY 8 1973 3,732,491
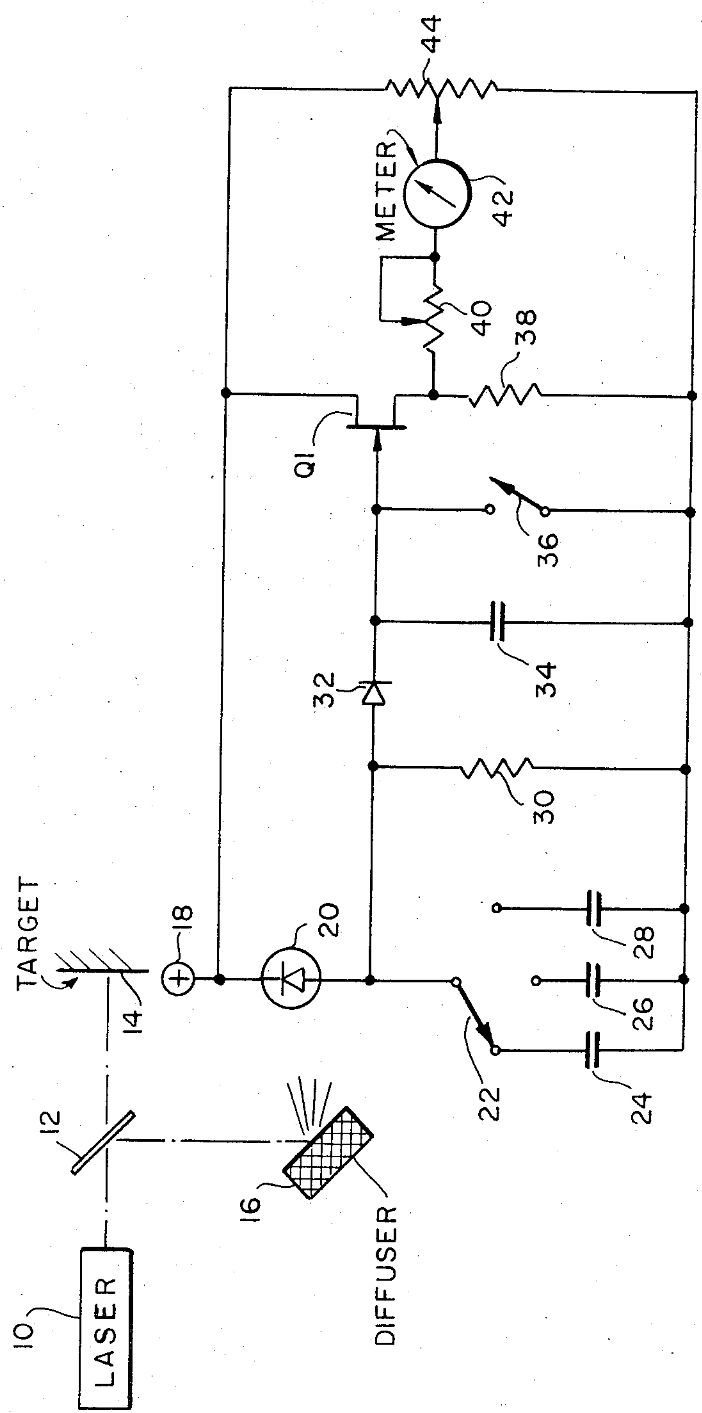
INVENTOR.
ALBERT D. BATTISTA
BY Joel Wall
ATTORNEYS

LASER ENERGY MONITOR CIRCUIT

This invention relates to energy monitor circuits, and more particularly to laser energy measurement systems.

In many pulsed laser applications, an operator observes the target at which the laser is aimed during its operation. In addition to observing the effects of the radiation on the target, the operator often needs to known the total energy which impinged upon the target. Typically, a beam splitter is employed to divert a small, fixed fraction of the total laser energy output, and this fraction is measured to determine the energy which impinged upon the target.

In many laser applications, the laser pulse width is exceedingly short, and in the case of Q-switched lasers it is in the order of nanoseconds. If the instrument employed to measure the energy in the diverted light displays the measured value only for a brief instant, it is apparent that the instrument reading will no longer be present by the time the operator is free to look at it.

For this reason, various approaches have been taken to measure the energy in the deflected beam and to store the measurement. Usually, the diverted laser beam is made to fall upon a thermally responsive element, a property of which varies with the degree to which it is heated. For example, a thermocouple element may be employed, and its current output may be used to drive a micro-ammeter. The problem with such an approach, however, is that the output level is so low that the cost of the measuring equipment may often approach that of the laser itself. Similarly, it is possible to measure the energy of the deflected laser beam thermally, and to use the output of the thermal-responsive device to control an oscilloscope display. If the oscilloscope is of the storage type, the display will remain available. Again, however, the cost of the equipment (unless it is otherwise available) may be prohibitive.

It is an object of my invention to provide a laser energy measurement system which furnishes a reading of the energy in a laser beam long after the laser has been fired and yet which can be made at very low cost.

Briefly, in accordance with the principles of my invention, a beam splitter is employed to divert a small portion of the total laser energy output. This small portion is directed to a diffuser, and the reflected light impinges upon a photodiode. (The diffuser is used, as will be described below, in order that it be possible to use a relatively small-area diode.) The photodiode and its associated power supply function as a current generator, the current being proportional to the light which impinges upon the photodiode.

The current is integrated by one of several capacitors. The voltage across the selected capacitor at the end of the pulse is proportional to the integral of the current generated by the photodiode, and inversely proportional to the magnitude of the capacitor. It is the voltage which is a measure of the laser energy, and thus the use of different capacitors allows different energy ranges to be selected for measurement.

The voltage across the capacitor is transferred to a peak detector, which in turn drives an FET transistor arranged in a source follower configuration. The voltage at the transistor source is proportional to the peak voltage and is used to drive a meter. Because the voltage applied to the gate of the FET by the peak detector does not diminish for a very long time (in the order of 30 minutes or more), the meter reading remains available until it is observed by the operator. Prior to another firing of the laser, the system can be reset so that a new measurement can be taken.

It is a feature of my invention to direct a portion of a laser beam to a photodiode, to integrate the current generated by the photodiode to derive a voltage which is transferred to a peak detector, and to then use the output of the peak detector to drive a meter.

Further objects, features, and advantages of the invention will become apparent upon consideration of the following detailed description in conjunction with the drawing which depicts an illustrative embodiment of the invention.

Laser 10 is operated to direct a beam of energy toward target 14. The laser beam first hits beam splitter 12 and, while most of the beam is transmitted through the beam splitter, a small portion is reflected to diffuser 16. The beam splitter can be ordinary glass in which case, as a result of Fresnel reflection, approximately 6 percent of the beam is reflected to the diffuser.

The light which strikes the diffuser is diffused and directed to photodiode 20. The laser beam may have hot spots, with the intensity of the energy being much greater in some small regions through the cross-section of the beam than in others. To measure the total energy emitted by the laser, the entire reflected beam could be directed to the face of a photodiode. However, this would require the use of a diode with a large area. Such a diode has a large internal capacitance and in many cases it may not be possible for the diode to respond to very short laser pulses. In order to limit the area (and capacitance) of the photodiode, only a part of the deflected laser beam is directed to the photodiode. But that part which impinges upon the face of the photodiode must represent the average intensity; care must be taken that the "representative" portion of the light which impinges upon the photodiode is not weighted in favor of the hot spots or any other region in the cross-section of the laser beam. The diffuser, which can be a magnesium carbonate block, functions as an averaging device. Since light in any small region of the cross-section of the beam is diffused in all directions, the light which strikes the photodiode, while less than the entire beam, is proportional to the total energy.

The photodiode and source 18 together function as a current generator; the current which flows through the diode at any time from source 18 is directly proportional to the instantaneous intensity of the light which impinges upon its face. The current is thus directly proportional to the intensity (power) of the beam emitted by the laser. A silicon photodiode has such a broad response that the energy monitor circuit of the invention can be used with almost all commercially available lasers.

The total energy in the laser pulse can be determined by integrating the photodiode current with respect to time. When no light impinges on photodiode 20, no current flows through photodiode 20; thus, current flows only during the time of occurence of the laser light pulse. The integral of the current over the duration of the pulse is proportional to the integral of the power output of the laser with respect to time. Capacitors 24, 26 and 28 function as integrators for the duration of each laser pulse. Depending on the setting of switch 22, one of the capacitors is connected in series with the photodiode. The charge stored on the connected capacitor is equal to the integral of the current. The voltage across the capacitor is equal to the charge divided by the capacitance. Thus the larger the capacitor, the smaller the voltage. By using different magnitude capacitors, switch 22 can be used to set the range of meter 42, since the meter reading, as will be shown, in directly proportional to the voltage across the selected capacitor.

Resistor 30 is of high impedance and does not affect the voltage across the capacitor connected in the circuit, but does allow the charge on the selected capacitor to leak off between laser pulses. Thus, for the durations of laser pulses with which we are concerned (generally measured in nanoseconds) either capacitors 24, 26, or 28 behave as an integrator with respect to current flowing through diode 20 during the time of the laser pulse; of course, when the charge on the selected capacitor leaks off between laser pulses through resistor 30 it is not then functioning as an integrator. The voltage across the selected capacitor must remain at its peak value only long enough to be transferred to capacitor 34. Thereafter, the capacitor which is initially charged is allowed to discharge in preparation for the next measurement.

The voltage across the selected one of capacitors 24, 26 and 28 is extended through diode 32 to capacitor 34 (these two elements form a peak detector), this latter capacitor charging to the peak value. Capacitor 34 is connected to the gate of FET transistor Q1. Depending on the magnitude of the voltage, current flows from source 18 through the transistor and resistor 38. Transistor Q1 is connected in a source follower configuration. The voltage across resistor 38 equals the voltage across capacitor 34, except for a slight offset. (Even if the voltage at the gate of the transistor is ground, there is a small voltage at the source of the transistor.) Potentiometer 44 serves to null the meter. When switch 36 is closed, the meter reading should be zero. The tap of potentiometer 44 is adjusted such that the voltage at the tap just equals the voltage at the source of the transistor. In such a case, no current flows through the meter and it is zero'ed as required. After the meter is nulled, switch 36 must be opened in order for a measurement to be taken.

Potentiometer 40 can also be used as a scaling device along with capacitors 24, 26 and 28. The meter responds to the current which flows through it, and consequently potentiometer 40 can be used to scale the meter reading by controlling the current which flows through it.

Each time the laser is fired, capacitor 34 charges to the peak voltage which appears across the selected one of capacitors 24, 26 and 28. Since the input impedance to transistor Q1 is very high, it takes a very long time for the charge across capacitor 34 to leak off. Consequently, the meter reading may be present even an hour after the laser has been fired. Prior to each new measurement, switch 36 is closed to discharge capacitor 34. At this time the meter reading falls to zero as capacitor 34 is discharged. The switch is then opened in preparation for another measurement cycle. If desired, switch 36 can be made to close and then open automatically prior to each new laser operation, that is, the switch which controls the firing of the laser may actually cause the meter to be reset to zero before the laser is fired, as will be apparent to those skilled in the art.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. A laser energy monitor circuit for measuring the energy in a nanosecond-range laser pulse and displaying the measurement long after the pulse has terminated comprising means responsive to laser light impinging thereon for generating a current proportional to the intensity of said laser light, means responsive to the operation of said generating means for integrating the current generated by said generating means, capacitor means responsive to operation of said integrating means for developing a potential which is proportional to the integral of said current, amplifying means having an input and an output terminal, means for coupling said capacitor means to said input terminal, means connected to said output terminal and having a response proportional to the voltage at said output terminal for providing an indication of the energy in said laser pulse, beam splitter means connected in the path of the laser light for deflecting a small portion of said laser light so that only a fraction of the total energy in said laser pulse to be measured is directed to said generating means, means for diffusing the deflected laser light disposed adjacent to said generating means in order to provide that said fraction of the total energy is representative of the total energy in said laser light, said integrating means further including an additional capacitor connected in series with said generating means for developing a voltage thereacross which is proportional to the integral of the current generated by said generating means and means for transferring the voltage across said additional capacitor to said capacitor means coupled to said input terminal, said monitor circuit further including means for discharging said capacitor means prior to each operation thereof, and wherein said means for providing an indication includes a meter having one end coupled to said output terminal, and means for applying an adjustable potential to the other end of said meter.

* * * * *